United States Patent [19]

Arai et al.

[11] Patent Number: 5,064,898

[45] Date of Patent: Nov. 12, 1991

[54] ROOM TEMPERATURE-CURABLE ORGANOPOLYSILOXANE COMPOSITION AND METHOD FOR THE PREPARATION THEREOF

[75] Inventors: Masatoshi Arai; Shinichi Satoh; Tsuneo Kimura; Kazuyuki Suzuki, all of Gunma; Tatsuya Kagosaki; Seiji Shimada, both of Aichi, all of Japan

[73] Assignees: Shin-Etsu Chemical Co., Tokyo; Toyota Jidosha Kabushiki Kaisha, Toyota, both of Japan

[21] Appl. No.: 473,762

[22] Filed: Feb. 2, 1990

[30] Foreign Application Priority Data

Feb. 17, 1989 [JP] Japan ...................................... 1-37893

[51] Int. Cl.$^5$ .............................................. C08K 3/08
[52] U.S. Cl. .................................... 524/780; 524/859; 524/864; 524/865; 524/787; 524/788; 525/477; 528/18
[58] Field of Search .......................... 528/18; 525/477; 524/864, 865, 859, 780, 787, 788

[56] References Cited

U.S. PATENT DOCUMENTS 4,595,610  6/1986  Fey et al. .............................. 528/18
4,721,766  1/1988  Inoue et al. ........................... 528/18

Primary Examiner—Melvyn I. Marquis
Attorney, Agent, or Firm—Millen, White & Zelano

[57] ABSTRACT

A room temperature-curable organopolysiloxane composition, which is capable of giving a cured silicone rubber having excellent resistance against oils, e.g., automobile engine oil, and little responsible for foaming of the oil contaminated with the silicone rubber, can be prepared by first blending a silanol-terminated dimethyl polysiloxane, an iminoxy-substituted organosilane compound, e.g., vinyl tributanoxime silane, an organotin compound as a catalyst and an inorganic filler. e.g, zinc oxide, to give a uniform mixture and further admixing the uniform mixture with a trimethylsilyl-terminated dimethyl polysiloxane, an alkenyloxy-substituted organosilane compound, e.g., vinyl triisopropenyloxy silane, and a methyl polysiloxane having a network structure of the molecules as consisting of the monofunctional units of the formula $(CH_3)_3SiO_{0.5}$ and tetrafunctional units of the formula $SiO_2$ each in a specified amount.

11 Claims, No Drawings

ROOM TEMPERATURE-CURABLE ORGANOPOLYSILOXANE COMPOSITION AND METHOD FOR THE PREPARATION THEREOF

BACKGROUND OF THE INVENTION

The present invention relates to a room temperature-curable organopolysiloxane composition or, more particularly, to a room temperature-curable organopolysiloxane composition capable of giving a cured silicone rubber useful as a material of so-called FIPG sealing in automobiles under contacting with lubricating oils, e.g., engine oil and gear oil, under vigorous agitation by virtue of the absence of any adverse influences on the foaming behavior of the oil due to the contamination of the oil with certain constituents dissolved out of the silicone rubber contacting with the oil. The invention also relates to a method for the preparation of such a room temperature-curable organopolysiloxane composition.

Traditional oil-resistant sealing materials used in and around automobile engines include cork, organic rubbers, asbestos and the like and these materials are used in the form of gaskets and packings. A problem in these materials in the automobile industry is the troublesomeness in the control of stockpile inventory and process control even by setting aside the disadvantage that the oil-sealability performance of these materials is not always quite reliable. Accordingly, these traditional oil-sealing materials have been mostly replaced with the so-called FIPG (formed-in-place gasket) sealing by utilizing a room temperature-curable organopolysiloxane composition or room temperature-curable silicone rubber which is a pasty or putty-like composition capable of being cured at room temperature into a cured silicone rubber. By virtue of the excellent properties of the room temperature-curable organopolysiloxane compositions, the FIPG sealing is highly evaluated, though not free from problems, in respect of the workability, sealability and heat resistance as compared with the traditional oil-sealing materials.

The most serious problem encountered in the use of a room temperature-curable silicone rubber for the FIPG sealing in automobiles is that, when the FIPG silicone rubber is in contact with the lubricating oil in an automatic transmission, in particular, in the front engine-front drive type cars which is integral with the differential gear, the oil contaminated with certain constituents of the silicone rubber sometimes foams seriously due to the vigorous agitation with the gears to be eventually prohibitive of the use of the FIPG sealing due to oil leakage. Although various attempts and proposals have been made to solve the above described problems, none is known as a room temperature-curable silicone rubber composition for the FIPG oil-sealing exhibiting high oil-resistant adhesive bonding.

SUMMARY OF THE INVENTION

The present invention accordingly has an object to provide a novel room temperature-curable organopolysiloxane composition capable of giving a cured silicone rubber free from the problem of foaming of the lubricating oil under agitation when the oil is contaminated with the silicone rubber as well as to provide a method for the preparation of such an improved room temperature-curable organopolysiloxane composition.

Thus, the room temperature-curable organopolysiloxane composition of the invention comprises, as a blend:

(A) 100 parts by weight of a blend comprising
 (A-1) a diorganopolysiloxane terminated at each molecular chain end with a silanolic hydroxy group,
 (A-2) an iminoxy-substituted organosilane compound represented by the general formula $$R^1{}_{4-n}Si(O-N=CR^2R^3)_n, \tag{I}$$

in which $R^1$ is a monovalent hydrocarbon group, $R^2$ and $R^3$ are each, independently from the other, a hydrogen atom or a monovalent hydrocarbon group or $R^2$ and $R^3$ are each a divalent hydrocarbon group jointly forming a ring structure together with the carbon atom bonded to the nitrogen atom, and the subscript n is 3 or 4, or a partial hydrolysis product thereof in an amount in the range from 1 to 25% by weight based on the component (A-1),
 (A-3) an organotin carboxylate ester compound in an amount in the range from 0.01 to 10% by weight based on the component (A-1), and
 (A-4) an inorganic filler, such as carbon powder, zinc oxide, zinc carbonate, magnesium oxide and calcium carbonate, in an amount in the range from 1 to 500% by weight based on the component (A-1);
admixed with
(B) from 0.1 to 20 parts by weight of
 (B-1) a diorganopolysiloxane having an average degree of polymerization of at least 300, each terminal group being a triorganosiloxy group,
 (B-2) an aminopropyl-substituted diorganopolysiloxane represented by the general formula $$R_2R^5Si-O-[-SiR(C_3H_6NHR^4)-O-]_p-[-SiR_2-O-]_q-SiR_2R^5, \tag{II}$$

in which each R is, independently from the others, a monovalent hydrocarbon group, $R^4$ is a hydrogen atom or an aminoalkyl group, each $R^5$ is, independently from the others, a monovalent hydrocarbon group or an aminopropyl group of the formula $-(-CH_2-)_3-NHR^4$, the subscript p is a positive integer and the subscript q is zero or a positive integer,
or a combination of (B-1) and (B-2);
(C) from 0.1 to 10 parts by weight of
 (C-1) an alkenyloxy-substituted organosilane compound represented by the general formula $$R^6{}_{4-m}Si(O-CR^7=CHR^8)_m, \tag{III}$$

in which $R^6$ is a monovalent hydrocarbon group, $R^7$ and $R^8$ are each, independently from the other, a hydrogen atom or a monovalent hydrocarbon group or $R^7$ and $R^8$ are each a divalent hydrocarbon group jointly forming a ring structure together with the two carbon atoms bonded with the double bond and the subscript m is a positive integer not exceeding 4, or a partial hydrolysis product thereof,
 (C-2) a β-substituted ketene silyl acetal compound represented by the general formula $$R^9{}_{4-r}Si[O-C(OR^{12})=CR^{10}R^{11}]_r, \tag{IV}$$

in which $R^9$ is a monovalent hydrocarbon group, $R^{10}$ is a hydrogen atom or a monovalent hydrocarbon group, $R^{11}$ and $R^{12}$ are each, independently from the other, a hydrogen atom or a monovalent hydrocarbon group or $R^{11}$ and $R^{12}$ are each a divalent hydrocarbon group jointly forming a ring structure together with the two carbon atoms bonded with the double bond and the oxygen atom to which $R^{12}$ is bonded, and the subscript r is a positive integer not exceeding 4, or a partial hydrolysis product thereof, or a combination of (C-1) and (C-2); and (D) from 0.1 to 50 parts by weight of an organopolysiloxane having a network structure consisting of monofunctional triorganosiloxy units of the formula $R_3SiO_{0.5}$, R being a monovalent hydrocarbon group, and tetrafunctional siloxane units of the formula $SiO_2$.

The above defined room temperature-curable organopolysiloxane composition of the invention can be prepared by first blending the components (A-1) to (A-4) to form a uniform blend, which is then admixed with the components (B) to (D) each in a specified amount.

DETAILED DESCRIPTION OF THE PREFERRED EMBODIMENTS

As is described above, the basic constituent in the inventive composition is the component (A), which is a mixture of the components (A-1) to (A-4), admixed with the components (B) to (D) each in a specified amount. In the following, detailed descriptions are given of these essential constituents of the inventive composition.

The component (A-1) is a diorganopolysiloxane terminated at each molecular chain end with a silanolic hydroxy group to react with the iminoxy group in the component (A-2) to form crosslinks so as to convert the composition into a cured silicone rubber. The hydroxy-terminated diorganopolysiloxane as the component (A-1), which is a well known material in the art of silicones, is represented by the general formula

$$HO-(-SiR_2-O-)_s-H, \qquad (V)$$

in which each R is, independently from the others, a monovalent hydrocarbon group selected from the class consisting of alkyl groups, e.g., methyl, ethyl and propyl groups, cycloalkyl groups, e.g., cyclohexyl group, alkenyl groups, e.g., vinyl and allyl groups, and aryl groups, e.g., phenyl and tolyl groups, as well as those substituted groups obtained by replacing a part or all of the hydrogen atoms in the above named hydrocarbon groups with halogen atoms and the like. The subscript s in the formula (V) is a positive integer of at least 10 or of such a value that the diorganopolysiloxane may have a viscosity in the range from 25 to 500,000 centistokes or, preferably, in the range from 1,000 to 100,000 centistokes at 25° C.

The component (A-2) is an iminoxy-substituted organosilane compound represented by the above given general formula (I). In this formula, $R^1$ is a substituted or unsubstituted monovalent hydrocarbon group selected from the same class as for the symbol R in the general formula (V) described above and $R^2$ and $R^3$ are each, independently from the other, a hydrogen atom or a monovalent hydrocarbon group or $R^2$ and $R^3$ are each a divalent hydrocarbon group jointly forming a ring structure together with the carbon atom bonded to the nitrogen atom. The subscript n in the formula (I) is 3 or 4.

Examples of the iminoxy-substituted organosilane compound suitable as the component (A-2) include methyl tributanoxime silane, vinyl tributanoxime silane, phenyl tributanoxime silane, propyl tributanoxime silane, tetrabutanoxime silane, 3,3,3-trifluoropropyl tributanoxime silane, 3-chloropropyl tributanoxime silane, methyl tripropanoxime silane, methyl tripentanoxime silane, methyl triisopentanoxime silane, vinyl tricyclopentanoxime silane, methyl tricyclohexanoxime silane and the like. Partial hydrolysis products of these silane compounds can also be used as the component (A-2). The iminoxy-substituted organosilane compound can readily be prepared by the dehydrochlorination reaction between a halogenosilane compound and an oxime compound in the presence of an acid acceptor such as an amine compound, e.g., trimethyl amine and N,N-dimethyl aniline, or metallic sodium.

The amount of the component (A-2) in the component (A) is in the range from 1 to 25% by weight based on the component (A-1). When the amount of the component (A-2) is too small, the composition may be subject to eventual gelatin in the course of preparation or during storage or the cured silicone rubber obtained from the composition may have poor properties. When the amount of the component (A-2) is too large, on the other hand, the composition may exhibit an unduly increased shrinkage by curing and the cured silicone rubber also has a somewhat decreased rubbery elasticity.

The component (A-3) compounded with the above described components (A-1) and (A-2) is an organic tin compound to serve as a catalyst for the reaction between the components (A-1) and (A-2). Examples of the organic tin compound suitable as the component (A-3) include organotin carboxylate alkyl ester compounds, e.g., dibutyltin diacetate, dibutyltin dilaurate, dibutyl tin dioctate and the like, and tin orthoester compounds, of which the organotin carboxylate alkyl ester compounds are preferred in respect of the high catalytic activity and easiness in handling.

The amount of the component (A-3) compounded in the component (A) is in the range from 0.01 to 10% by weight or, preferably, from 0.1 to 1% by weight based on the component (A-1). When the amount of the component (A-3) is too small, tack-free surface filming of the composition exposed to air can be obtained only by taking an unduly long time and an impractically long time would be taken for complete curing of the composition in the core portion of a thick body. When the amount of the component (A-3) is too large, on the other hand, the surface filming of the composition proceeds too rapidly to be complete, for example, within several seconds upon exposure to the atmospheric air so that the composition can hardly be used in practical use in addition to the problem that the cured silicone rubber obtained from the composition may have poor heat resistance.

The component (A-4) compounded in the component (A) is an inorganic filler which is selected, preferably, from the group consisting of carbon powders, zinc oxide, zinc carbonate, magnesium oxide and calcium carbonate. The inorganic filler serves to impart increased resistance against oils, e.g., engine oil and gear oil, to the cured silicone rubber obtained from the composition. The amount of the component (A-4) compounded in the component (A) is in the range from 1 to 500% by weight or, preferably, from 5 to 100% by weight based on the component (A-1). When the amount of the component (A-4) is too small, no sufficiently high oil resistance can be imparted to the cured silicone rubber as a matter of course. When the amount of the component (A-4) is too large, on the other hand, the composition cannot give a cured silicone rubber having good rubbery elasticity.

It is important in the preparation of the inventive organopolysiloxane composition that the above described components (A-1) to (A-4) each in a specified amount are first compounded together uniformly to give the component (A) which is then admixed with the components (B) to (D) described below. No satisfactory results would be obtained when the components (A-1) to (A-4), (B), (C) and (D) are compounded together at one time.

The component (B) to be compounded with the component (A), i.e. a uniform blend of the components (A-1) to (A-4), is a diorganopolysiloxane as the component (B-1), an aminopropyl-substituted diorganopolysiloxane as the component (B-2) or a combination thereof. This component (B) serves to reduce foaming of the oil contaminated by contacting with the cured silicone rubber. The component (B-1) is a diorganopolysiloxane having an average degree of polymerization of at least 300, each terminal group being a triorganosiloxy group, represented by the general formula

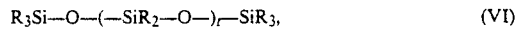
(VI)

in which R has the same meaning as defined bofore and the subscript t is an integer of 298 or larger so that the degree of polymerization of the diorganopolysiloxane is 300 or larger. When the degree of polymerization of the diorganopolysiloxane is too small, the foam-reducing effect by the addition thereof would be poor.

The component (B-2), which is alternative to the component (B-1), is an aminopropyl-substituted diorganopolysiloxane represented by the general formula (II) given before, in which each R is, independently from the others, a monovalent hydrocarbon group, $R^4$ is a hydrogen atom or an aminoalkyl group, each $R^5$ is, independently from the others, a monovalent hydrocarbon group or an aminopropyl group of the formula $-(-CH_2-)_3-NHR^4$, the subscript p is a positive integer and the subscript q is zero or a positive integer.

The amount of the component (B), i.e. the component (B-1), component (B-2) or a combination thereof, in the inventive composition is in the range from 0.1 to 20 parts by weight or, preferably, from 3 to 15 parts by weight per 100 parts by weight of the component (A). When the amount of the component (B) is too small, the foam-reducing effect obtained by the addition thereof would be poor. When the amount of the component (B) is too large, on the other hand, certain adverse influences are caused on the mechanical strengths of the cured silicone rubber obtained from the composition.

The component (C) in the inventive organopolysiloxane composition is an alkenyloxy-substituted organosilane compound as the component (C-1), a β-substituted ketene silyl acetal compound as the component (C-2) or a combination thereof. This component also serves as a foam-reducing agent synergistically with the component (B). The alkenyloxy-substituted organosilane compound as the component (B-1) is represented by the general formula (III) given before, in which $R^6$ is a monovalent hydrocarbon group, $R^7$ and $R^8$ are each, independently from the other, a hydrogen atom or a monovalent hydrocarbon group or $R^7$ and $R^8$ are each a divalent hydrocarbon group jointly forming a ring structure together with the two carbon atoms bonded with the double bond and the subscript m is a positive integer not exceeding 4. A partial hydrolysis product of the silane compound can also be used as the component (C-1).

Examples of the alkenyloxy-substituted organosilane compound as the component (C-1) include trimethyl isopropenyloxy silane, dimethyl di(isopropenyloxy) silane, methyl tri(isopropenyloxy) silane, vinyl tri(isopropenyloxy) silane, phenyl tri(isopropenyloxy) silane, propyl tri(isopropenyloxy) silane, tetra(isopropenyloxy) silane, 3,3,3-trifluoropropyl tri(isopropenyloxy) silane, 3-chloropropyl tri(isopropenyloxy) silane, methyl tri(1-phenylethynyloxy) silane, methyl tri(isopentenyloxy) silane, methyl tri(isobutenyloxy) silane, vinyl tricyclopentenyloxy silane, methyl tri(cyclohexenyloxy) silane and the like. These alkenyloxy-substituted organosilane compounds can be prepared by the dehydrochlorination reaction between a ketone compound and a halogenosilane in the presence of an acid acceptor such as an amine compound, e.g., triethyl amine and N,N-dimethyl aniline, or metallic sodium and, if necessary, a catalytic compound such as zinc oxide.

The component (C-2), which is alternative to the component (C-1) described above, is a ketene silyl acetal compound represented by the general formula (IV) given before, in which $R^9$ is a monovalent hydrocarbon group, $R^{10}$ is a hydrogen atom or a monovalent hydrocarbon group, $R^{11}$ and $R^{12}$ are each, independently from the other, a hydrogen atom or a monovalent hydrocarbon group or $R^{11}$ and $R^{12}$ are each a divalent hydrocarbon group jointly forming a ring structure together with the two carbon atoms bonded with the double bond and the oxygen atom to which $R^{12}$ is bonded, and the subscript r is a positive integer not exceeding 4. A partial hydrolysis product of these silane compounds can also be used as the component (C-2).

Examples of the ketene silyl acetal compound as the component (C-2) include trimethyl(α-methoxy isobutenyloxy) silane, dimethyl di(α-methoxy isobutenyloxy) silane, methyl tri(α-methoxy isobutenyloxy) silane, triphenyl (α-methoxy isobutenyloxy) silane, trimethyl (α-ethoxy isobutenyloxy) silane, trimethyl (α-cyclohexyloxy isobutenyloxy) silane, trimethyl (α-benzyloxy isobutenyloxy) silane and the like. These ketene silyl acetal compounds can be prepared by subjecting an ester compound and a hydrogenosilane compound to the 1,4-addition reaction in the presence of a rhodium complex as a catalyst.

The amount of the component (C), i.e. the component (C-1), component (C-2) or a combination thereof, in the inventive organopolysiloxane composition is in the range from 0.1 to 10 parts by weight per 100 parts by weight of the component (A). When the amount of the component (C) is too small, the foam-reducing effect to be obtained by the addition of this component is insufficient as a matter of course. When the amount thereof is too large, on the other hand, the composition may exhibit an unduly large shrinkage by curing in addition to a decrease in the rubbery elasticity of the cured silicone rubber obtained from the composition.

The component (D) in the inventive organopolysiloxane composition is an organopolysiloxane having a network structure of the molecules as consisting of the monofunctional triorganosiloxy units of the formula $R_3SiO_{0.5}$, in which R has the same meaning as defined before, and tetrafunctional siloxane units of the formula SiO₂. This component serves as an adhesion improver of the inventive composition after curing to the surface of aluminum, iron and the like on which the composition has been cured. Such an organopolysiloxane having a network structure can be prepared by the cohydrolysis of a triorgano chlorosilane compound and tetrachlorosilane or a triorgano alkoxy silane compound and a tetraalkoxy silane compound. Examples of the triorgano chlorosilane compound include trimethyl chlorosilane, vinyl dimethyl chlorosilane, phenyl dimethyl chlorosilane, allyl dimethyl chlorosilane, divinyl methyl chlorosilane, trivinyl chlorosilane, triphenyl chlorosilane and the like. Examples of the triorgano alkoxy silane compound include trimethyl methoxy silane, vinyl dimethyl methoxy silane, phenyl dimethyl ethoxy silane, allyl dimethyl methoxy silane, divinyl methyl methoxy silane, trivinyl methoxy silane, triphenyl methoxy silane, trimethyl propoxy silane, trimethyl butoxy silane and the like. Examples of the tetraalkoxy silane compound include tetramethoxy silane, tetraethoxy silane, tetrapropoxy silane, tetrabutoxy silane and the like. The cohydrolysis reaction of these silane compounds is performed by the dropwise addition of a mixture of these silane compounds into a mixture of an organic solvent, e.g., benzene and toluene, and water under agitation.

The amount of the above described component (D) in the inventive organopolysiloxane composition is in the range from 0.1 to 50 parts by weight or, preferably, from 1 to 10 parts by weight per 100 parts by weight of the component (A). When the amount of the component (D) is too small, no sufficient adhesive bonding can be obtained between the cured silicone rubber of the composition and the substrate surface on which the composition has been cured. When the amount thereof is too large, on the other hand, the cured silicone rubber obtained from the composition would have poor mechanical properties as a rubber.

The organopolysiloxane composition of the present invention can be prepared by first blending each in a specified amount of the components (A-1) to (A-4) uniformly in a dry atmosphere to give a component (A) which is then admixed with each in a specified amount of the components (B), (C) and (D). The composition, which is stable under a hermetically sealed condition, is converted into a cured silicone rubber when it is exposed to the atmosphere containing moisture by a crosslinking reaction.

It is of course optional that the inventive organopolysiloxane composition is further admixed with various kinds of known additives conventionally used as a constituent of silicone rubber compositions including reinforcing fillers such as fumed silica filler, precipitated silica filler, titanium dioxide, aluminum oxide, quartz powder, talc, bentonite and the like, fibrous fillers such as asbestos, glass fibers, organic fibers and the like, oil-resistance improvers such as potassium acrylate and the like, coloring agents, heat-resistance improvers such as red iron oxide, ceric oxide and the like, cold-resistance improvers, thixotropic agents such as polyethers and the like, dehydrating agents, rust inhibitors, adhesion improvers such as 3-aminopropyl triethoxy silane and the like each in a limited amount.

To summarize the invention, the composition of the present invention is obtained by formulating a deoximation type room temperature-curable organopolysiloxane composition admixed with a tin-containing catalyst and a specific inorganic filler with further admixture of the components (B), (C) and (D) to serve as a foam-reducing agent, oil-resistance improver and adhesion improver so that the composition gives a cured silicone rubber having excellent resistance against oils used in automobiles, e.g., engine oil and gear oil, which is little responsible for foaming of the oil contaminated by contacting with the silicone rubber at an elevated temperature. Needless to say, each of the ingredient materials constituting the inventive composition is available in any quantities without a problem in supply so that the inventive composition is useful as a material not only for FIPG sealing in automobiles but also for sealing in construction machines and electric and electronic instruments working under a condition of vigorous agitation of the lubricating oils to cause a problem of foaming of the oil.

In the following, the present invention is described in more detail by way of examples and comparative examples, in which the term of "parts" always refers to "parts by weight" and the values of viscosity are all those obtained by the measurement at 25° C.

EXAMPLES 1 TO 4 AND COMPARATIVE EXAMPLE 1

A composition, referred to as the composition I hereinbelow, was prepared in Comparative Example 1 in the following manner. Thus, 100 parts of a dimethyl polysiloxane having a viscosity of 5200 centistokes and blocked at each molecular chain end with a silanolic hydroxy group as the component (A-1), 6.0 parts of vinyl tributanoxime silane as the component (A-2), 0.2 part of dibutyltin dilaurate as the component (A-3), 1.0 part of 3-aminopropyl triethoxy silane, 75 parts of zinc oxide as the component (A-4) and 16 parts of a fumed silica filler were blended together under an anhydrous condition to give a uniform mixture which was then admixed with 10.0 parts of a cohydrolysis product of a 3:4 by moles mixture of trimethyl chlorosilane and tetrachlorosilane as the component (D).

Four more compositions, referred to as the compositions II, III, IV and V hereinbelow, were prepared in Examples 1 to 4, respectively, in substantially the same manner as in the preparation of the composition I except that the admixture of the cohydrolysis product of the silane mixture as the component (D) is accompanied by the concurrent addition of 1 part of vinyl triisopropenyloxy silane as the component (C) and 1.0 part, 2.0 parts, 5.0 parts or 10.0 parts, respectively, of a dimethylpolysiloxane having an average degree of polymerization of about 515 and blocked at each molecular chain end with a trimethyl siloxy group as the component (B).

In the next place, 0.75 g of each of the compositions I to V prepared above as dissolved or dispersed in 3.75 g of xylene was added to 250 g of an engine oil (Toyota Genuine Castle Autofluid D-II, a product by Toyota Jidosha Kabushiki Kaisha) and uniformly dispersed therein. The thus contaminated engine oil was subjected to the evaluation of the foaming behavior according to the procedure specified in JIS K 2518 for the "Testing Method for Foaming of Petroleum Products" using the apparatus specified there at a temperature of 24° C. as prepared, at 93.5° C. by heating and at 24° C. after cooling of the once heatted oil. The same test of foaming of the oil was performed also for the contaminated oil after thermal aging at 165.5° C. for 72 hours. The results obtained in these foaming tests are shown in Table 1 below.

The foamability given in ml in the table means the volume of the foams on the oil surface immediately after 5 minutes of air bubbling through the diffuser stone of the apparatus and the foam stability given also in ml in the same table means the volume of the foams when the foams on the oil after measurement of the foamability mentioned above were kept standing at the same temperature for 10 minutes to be allowed to be broken. No foams were left unbroken in each of the foam stability tests of the contaminated oils before the thermal aging.

TABLE 1

| Composition No. | I | II | III | IV | V |
|---|---|---|---|---|---|
| Before thermal aging | | | | | |
| Foamability, ml, | | | | | |
| at 24° C. | 260 | 70 | 50 | 30 | 30 |
| at 93.5° C., | 820 | 100 | 70 | 40 | 30 |
| at 24° C., after cooling | 220 | 60 | 40 | 30 | 20 |
| After thermal aging | | | | | |
| Foamability, ml, | | | | | |
| at 24° C. | 680 | 80 | 60 | 40 | 30 |
| at 93.5° C. | 1120 | 150 | 90 | 60 | 50 |
| at 24° C., after cooling | 470 | 70 | 40 | 30 | 20 |
| Foam stability, ml | | | | | |
| at 24° C. | 20 | 0 | 0 | 0 | 0 |
| at 93.5° C. | 150 | 0 | 0 | 0 | 0 |
| at 24° C., after cooling | 30 | 0 | 0 | 0 | 0 |

EXAMPLES 5 AND 6 AND COMPARATIVE EXAMPLE 2

Three organopolysiloxane compositions, referred to as the compositions VI, VII and VIII hereinbelow, were prepared in Comparative Example 2 and Examples 5 and 6, respectively, each by first uniformly blending 100 parts of a dimethyl polysiloxane having a viscosity of 5300 centistokes and blocked at each molecular chain end with a silanolic hydroxy group as the component (A-1), 6.0 parts of vinyl tributanoxime silane as the component (A-2), 0.2 part of dibutyltin dilaurate as the component (A-3), 1.0 part of 3-aminopropyl triethoxy silane, 75 parts of zinc oxide as the component (A-4) and 16 parts of the same fumed silica filler as used in the preceding examples under an anhydrous condition to give a uniform mixture which was then admixed with 10.0 parts of a dimethyl polysiloxane having an average degree of polymerization of about 515 and blocked at each molecular chain end with a trimethyl siloxy group as the component (B) and 10.0 parts of the same cohydrolysis product of a mixture of trimethyl chlorosilane and tetrachlorosilane as used in the preceding examples as the component (D) without or together with 1.0 part or 2.0 parts, respectively, of vinyl triisopropenyloxy silane as the component (C).

These three compositions were subjected to the same foaming tests as in the preceding examples to give the results shown in Table 2 below. No foams were left unbroken in each of the foam stability tests of the contaminated oils before the thermal aging.

EXAMPLE 7 AND COMPARATIVE EXAMPLE 3

An organopolysiloxane composition, referred to as the composition IX hereinbelow, was prepared in Comparative Example 3 by blending, under an anhydrous condition, 100 parts of a dimethyl polysiloxane having a viscosity of 5300 centistokes and blocked at each molecular chain end with a silanolic hydroxy group as the component (A-1), 6.0 parts of vinyl triisopropenyloxy silane as the component (C), 0.8 part of 3-(tetramethylguanidino)propyl trimethoxy silane of the formula $(Me_2N)_2C=N-C_3H_6-Si(OMe)_3$, Me being a methyl group, 1.0 part of 3-aminopropyl triethoxy silane, 10.0 parts of the same cohydrolysis product of trimethyl chlorosilane and tetrachlorosilane as used in the preceding examples as the component (D), 10.0 parts of the same trimethylsiloxy-terminated dimethyl polysiloxane as used in the preceding examples as the component (B), 100 parts of zinc oxide as the component (A-4) and 20 parts of the same fumed silica filler as used in the preceding examples.

Separately, another organopolysiloxane composition, referred to as the composition X hereinbelow, was prepared in Example 7 by first blending, under an anhydrous condition, 100 parts of the same silanol-terminated dimethyl polysiloxane as used above as the component (A-1), 6.0 parts of vinyl tributanoxime silane as the component (A-2), 0.2 part of dibutyl tin dilaurate as the component (A-3), 1.0 part of 3-aminopropyl triethoxy silane, 100 parts of zinc oxide as the component (A-4) and 20 parts of the same fumed silica filler as used above to give a uniform mixture which was then further admixed with 10.0 parts of the same trimethylsiloxy-terminated dimethyl polysiloxane as used above as the component (B), 1.0 part of vinyl triisopropenyloxy silane as the component (C) and 10.0 parts of the same cohydrolysis product of trimethyl chlorosilane and tetrachlorosilane as used above as the component (D).

The compositions IX and X were subjected to the tests of the foaming behavior of the engine oil in the same manner as in the preceding examples either before or after thermal aging of the contaminated engine oil to give the results shown in Table 2 below. No foams were left unbroken in the foam stability test for each of these compositions.

TABLE 2

| Composition No. | VI | VII | VIII | IX | X |
|---|---|---|---|---|---|
| Before thermal aging | | | | | |
| Foamability, ml, | | | | | |
| at 24° C. | 10 | 10 | 10 | 20 | 20 |
| at 93.5° C. | 20 | 20 | 10 | 60 | 20 |
| at 24° C., after cooling | 10 | 10 | 10 | 20 | 10 |
| After thermal aging | | | | | |
| Foamability, ml, | | | | | |
| at 24° C. | 620 | 40 | 30 | 30 | 30 |
| at 93.5° C. | 1270 | 50 | 10 | 50 | 40 |
| at 24° C., after cooling | 360 | 30 | 10 | 30 | 30 |
| Foam stability, ml | | | | | |
| at 24° C. | 20 | 0 | 0 | 0 | 0 |
| at 93.5° C. | 150 | 0 | 0 | 0 | 0 |
| at 24° C., after cooling | 0 | 0 | 0 | 0 | 0 |

In the next place, each of the compositions IX and X was shaped into a sheet of 2 mm thickness, which was kept standing in an atmosphere of 50% relative humidity at 20° C. for 7 days to be converted into a cured rubber sheet. These cured rubber sheets were subjected to the measurements of the mechanical properties including hardness, JIS A, tensile strength in kgf/cm$^2$ and ultimate elongation at break in % either as cured in the above described manner or after oil resistance test by immersing in the same engine oil as used in the preceding tests at 120° C. for 240 hours to give the results shown in Table 3 below.

Table 3 also shows the results obtained by the shearing adhesion tests using test panels of aluminum and steel bonded together by using these compositions as an adhesive. The procedure for the shearing adhesion test was as follows. Thus, test panels having a length of 100 mm, width of 25 mm and thickness of 1 mm made of aluminum specified in JIS H 4000 or steel specified in JIS G 3140, after polishing with sand paper, were coated with the composition on the end portion of 10 mm length on each panel and the panels were laid one on the other so as to have the coated areas are contacted with each other, the uncoated ends extending in the reverse directions, so as to form a layer of the composition as the adhesive having a thickness of 1 mm by using suitable spacers. The adhesive-coated portion was overlaid with a weight of 500 g and kept standing as such for 96 hours in an atmosphere of 50% relative humidity at 20° C. so that the composition was cured into a rubbery form to adhesively bond the panels together. The shearing adhesive bonding strength was determined by pulling apart the test panels either before or after an oil resistance test by immersing the test panels as bonded in the same engine oil as used in the preceding tests at 120° C. for 240 hours.

TABLE 3

| Composition No. | IX | X |
|---|---|---|
| Before oil resistance test | | |
| Hardness, JIS A | 56 | 50 |
| Tensile strength, kgf/cm$^2$ | 40 | 43 |
| Ultimate elongation, % | 220 | 250 |
| Shearing adhesion on aluminum, kgf/cm$^2$ | 11 | 19 |
| Shearing adhesion on steel, kgf/cm$^2$ | 16 | 18 |
| After oil resistance test | | |
| Hardness, JIS A | 29 | 26 |
| Tensile strength, kgf/cm$^2$ | 24 | 28 |
| Ultimate elongation, % | 260 | 270 |
| Shearing adhesion on aluminum, kgf/cm$^2$ | 2 | 15 |
| Shearing adhesion on steel, kgf/cm$^2$ | 1 | 10 |

What is claimed is:

1. A room temperature-curable organopolysiloxane composition which comprises, as a blend:
   (A) 100 parts by weight of a blend comprising
      (A-1) a diorganopolysiloxane terminated at each molecular chain end with a silanolic hydroxy group,
      (A-2) an iminoxy-substituted organosilane compound represented by the general formula $$R^1_{4-n}Si(O-N=CR^2R^3)_n,$$

in which $R^1$ is a monovalent hydrocarbon group, $R^2$ and $R^3$ are each, independently from the other, a hydrogen atom or a monovalent hydrocarbon group or $R^2$ and $R^3$ are each a divalent hydrocarbon group jointly forming a ring structure together with the carbon atom bonded to the nitrogen atom, and the subscript n is 3 or 4, or a partial hydrolysis product thereof in an amount in the range from 1 to 25% by weight based on the component (A-1),
      (A-3) an organotin carboxylate ester compound in an amount in the range from 0.01 to 10% by weight based on the component (A-1), and
      (A-4) an inorganic filler in an amount in the range from 1 to 500% by weight based on the component (A-1);
   admixed with
   (B) from 0.1 to 20 parts by weight of
      (B-1) a diorganopolysiloxane having an average degree of polymerization of at least 300, each terminal group being a triorganosiloxy group,
      (B-2) an aminopropyl-substituted diorganopolysiloxane represented by the general formula $$R_2R^5Si-O-[-SiR(C_3H_6NHR^4)-O-]_p-[-SiR_2-O-]_q-SiR_2R^5,$$

in which each R is, independently from the others, a monovalent hydrocarbon group, $R^4$ is a hydrogen atom or an aminoalkyl group, each $R^5$ is, independently from the others, a monovalent hydrocarbon group or an aminopropyl group of the formula $-(-CH_2-)_3-NHR^4$, the subscript p is a positive integer and the subscript q is zero or a positive integer,
   or a combination of (B-1) and (B-2);
   (C) from 0.1 to 10 parts by weight of
      (C-1) an alkenyloxy-substituted organosilane compound represented by the general formula $$R^6_{4-m}Si(O-CR^7=CHR^8)_m,$$

in which $R^6$ is a monovalent hydrocarbon group, $R^7$ and $R^8$ are each, independently from the other, a hydrogen atom or a monovalent hydrocarbon group or $R^7$ and $R^8$ are each a divalent hydrocarbon group jointly forming a ring structure together with the two carbon atoms bonded with the double bond and the subscript m is a positive integer not exceeding 4, or a partial hydrolysis product thereof,
      (C-2) a β-substituted ketene silyl acetal compound represented by the general formula $$R^9_{4-r}Si[O-C(OR^{12})=CR^{10}R^{11}]_r,$$

in which $R^9$ is a monovalent hydrocarbon group, $R^{10}$ is a hydrogen atom or a monovalent hydrocarbon group, $R^{11}$ and $R^{12}$ are each, independently from the other, a hydrogen atom or a monovalent hydrocarbon group or $R^{11}$ and $R^{12}$ are each a divalent hydrocarbon group jointly forming a ring structure together with the two carbon atoms bonded with the double bond and the oxygen atom to which $R^{12}$ is bonded, and the subscript r is a positive integer not exceeding 4, or a partial hydrolysis product thereof, or a combination of (C-1) and (C-2); and
   (D) from 0.1 to 50 parts by weight of an organopolysiloxane having a network structure consisting of monofunctional triorganosiloxy units of the formula $R_3SiO_{0.5}$, R being a monovalent hydrocarbon group, and tetrafunctional siloxane units of the formula $SiO_2$.

2. The room temperature-curable organopolysiloxane composition as claimed in claim 1 wherein the inorganic filler as the component (A-1) is selected from the group consisting of carbon powder, zinc oxide, zinc carbonate, magnesium oxide and calcium carbonate.

3. The room temperature-curable organopolysiloxane composition as claimed in claim 1 wherein the diorganopolysiloxane as the component (A-1) is a dimethyl polysiloxane.

4. The room temperature-curable organopolysiloxane composition as claimed in claim 1 wherein the iminoxy-substituted organosilane compound as the component (A-2) is vinyl tributanoxime silane.

5. The room temperature-curable organopolysiloxane composition as claimed in claim 1 wherein the organotin carboxylate ester compound as the component (A-3) is selected from the group consisting of dibutyl tin diacetate, dibutyl tin dilaurate and dibutyl tin dioctoate.

6. The room temperature-curable organopolysiloxane composition as claimed in claim 2 wherein the inorganic filler as the component (A-1) is zinc oxide.

7. The room temperature-curable organopolysiloxane composition as claimed in claim 1 wherein the component (B) is a dimethyl polysiloxane having an average degree of polymerization of at least 300 and terminated at each molecular chain end with a trimethyl siloxy group.

8. The room temperature-curable organopolysiloxane composition as claimed in claim 1 wherein the component (C) is vinyl triisopropenyloxy silane.

9. The room temperature-curable organopolysiloxane composition as claimed in claim 1 wherein the organopolysiloxane having a network structure as the component (D) consists of monofunctional siloxane units of the formula $(CH_3)_3SiO_{0.5}$ and tetrafunctional siloxane units of the formula $SiO_2$.

10. A method for the preparation of a room temperature-curable organopolysiloxane composition which comprises the steps of:

(a) blending, under an anhydrous condition,
(A-1) a diorganopolysiloxane terminated at each molecular chain end with a silanolic hydroxy group,
(A-2) an iminoxy-substituted organosilane compound represented by the general formula $R^1{}_{4-n}Si(O-N=CR^2R^3)_n$, in which $R^1$ is a monovalent hydrocarbon group, $R^2$ and $R^3$ are each, independently from the other, a hydrogen atom or a monovalent hydrocarbon group or $R^2$ and $R^3$ are each a divalent hydrocarbon group jointly forming a ring structure together with the carbon atom bonded to the nitrogen atom, and the subscript n is 3 or 4, or a partial hydrolysis product thereof in an amount in the range from 1 to 25% by weight based on the component (A-1),
(A-3) an organotin carboxylate ester compound in an amount in the range from 0.01 to 10% by weight based on the component (A-1), and
(A-4) an inorganic filler in an amount in the range from 1 to 500% by weight based on the component (A-1), to give a uniform mixture; and (b) admixing 100 parts by weight of the uniform mixture prepared in step (a), under an anhydrous condition, with
(B) from 0.1 to 20 parts by weight of
(B-1) a diorganopolysiloxane having an average degree of polymerization of at least 300, each terminal group being a triorganosiloxy group,
(B-2) an aminopropyl-substituted diorganopolysiloxane represented by the general formula $R_2R^5Si-O-[-SiR(C_3H_6NHR^4)-O-]_p-[-SiR_2-O-]_q-SiR_2R^5$, in which each R is, independently from the others, a monovalent hydrocarbon group, $R^4$ is a hydrogen atom or an aminoalkyl group, each $R^5$ is, independently from the others, a monovalent hydrocarbon group or an aminopropyl group of the formula $-(-CH_2-)_3-NHR^4$, the subscript p is a positive integer and the subscript q is zero or a positive integer,
or a combination of (B-1) and (B-2),
(C) from 0.1 to 10 parts by weight of
(C-1) an alkenyloxy-substituted organosilane compound represented by the general formula $R^6{}_{4-m}Si(O-CR^7=CHR^8)_m$, in which $R^6$ is a monovalent hydrocarbon group, $R^7$ and $R^8$ are each, independently from the other, a hydrogen atom or a monovalent hydrocarbon group or $R^7$ and $R^8$ are each a divalent hydrocarbon group jointly forming a ring structure together with the two carbon atoms bonded with the double bond and the subscript m is a positive integer not exceeding 4, or a partial hydrolysis product thereof,
(C-2) a β-substituted ketene silyl acetal compound represented by the general formula $R^9{}_{4-r}Si[O-C(OR^{12})=CR^{10}R^{11}]_r$, in which $R^9$ is a monovalent hydrocarbon group, $R^{10}$ is a hydrogen atom or a monovalent hydrocarbon group, $R^{11}$ and $R^{12}$ are each, independently from the other, a hydrogen atom or a monovalent hydrocarbon group or $R^{11}$ and $R^{12}$ are each a divalent hydrocarbon group jointly forming a ring structure together with the two carbon atoms bonded with the double bond and the oxygen atom to which $R^{12}$ is bonded, and the subscript r is a positive integer not exceeding 4, or a partial hydrolysis product thereof, or a combination of (C-1) and (C-2), and
(D) from 0.1 to 50 parts by weight of an organopolysiloxane having a network structure consisting of monofunctional triorganosiloxy units of the formula $R_3SiO_{0.5}$, R being a monovalent hydrocarbon group, and tetrafunctional siloxane units of the formula $SiO_2$.

11. A silicone rubber article which is obtained by shaping and curing the room temperature-curable organopolysiloxane composition according to claim 1.

* * * * *